May 24, 1938. C. A. WINSLOW 2,118,283
LUBRICATING SYSTEM FOR INTERNAL COMBUSTION ENGINES
Original Filed Jan. 30, 1929
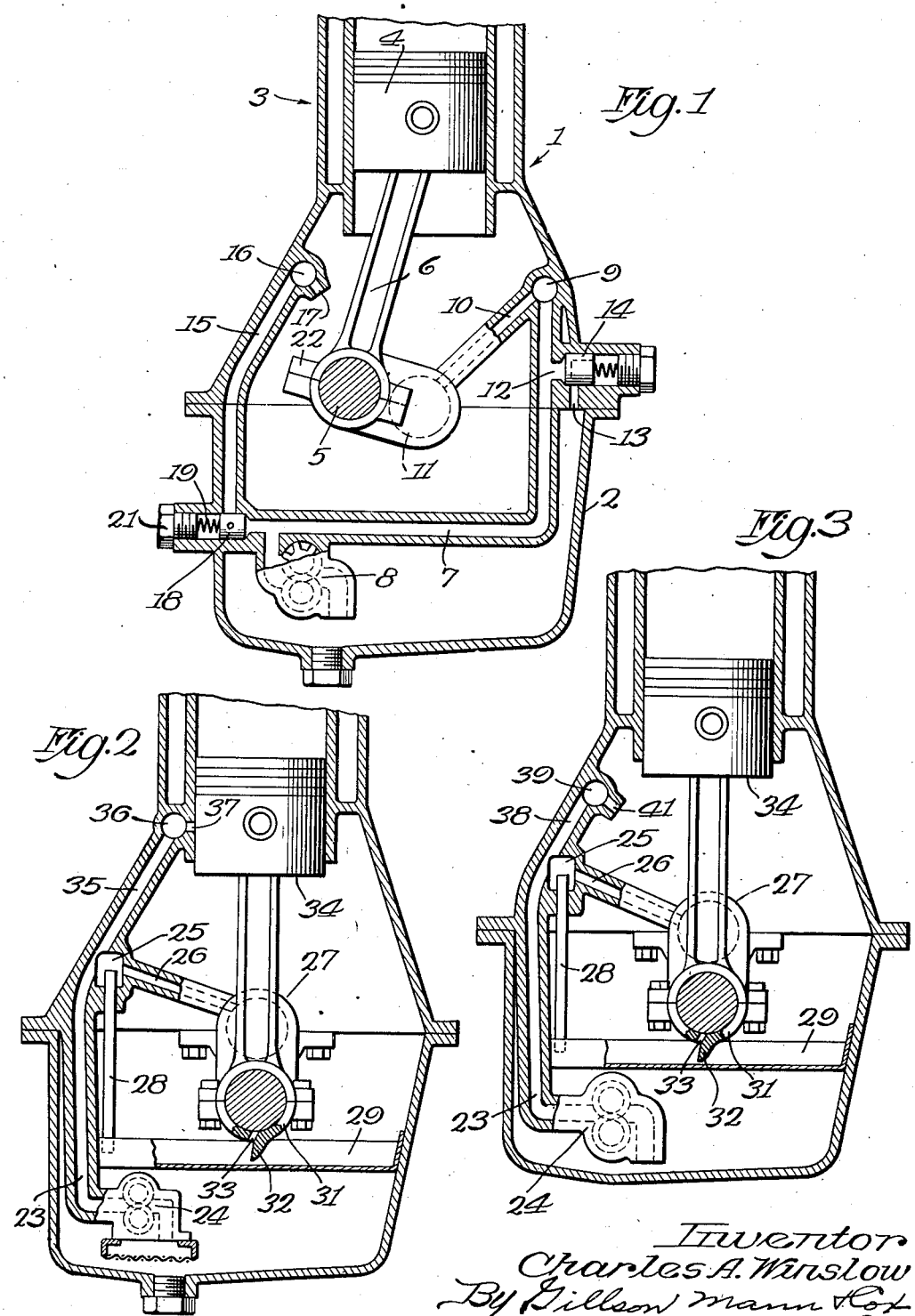
Inventor
Charles A. Winslow
By Gillson, Mann & Cox
Attys Patented May 24, 1938

2,118,283

UNITED STATES PATENT OFFICE 2,118,283

LUBRICATING SYSTEM FOR INTERNAL COMBUSTION ENGINES

Charles Ambrose Winslow, Oakland, Calif., assignor to Catherine B. Winslow, Oakland, Calif.

Original application January 30, 1929, Serial No. 336,158, now Patent No. 1,992,339. Divided and this application January 25, 1935, Serial No. 3,435

6 Claims. (Cl. 184—6)

This invention relates to lubrication systems for internal combustion engines and the principal object of the invention is the provision of new and improved means for lubricating the engine bearings and insuring proper lubrication of the pistons under all operating conditions.

Another object of the invention is the provision of new and improved primary and secondary systems for lubricating the moving parts of an internal combustion engine.

Another object of the invention is the provision of new and improved means for positively lubricating the pistons of internal combustion engines when the oil is abnormally viscous, as when starting the motor in cold weather.

A further object of the invention is the provision of a new and improved lubricating system for internal combustion engines wherein alternative means of novel construction is employed for lubricating the pistons under abnormal conditions or when the principal system for any reason does not function properly.

Another object of the invention is the provision of a new and improved system of lubricating for internal combustion engines which is inexpensive to manufacture, that is contained within the crank case of the engine, insures proper lubrication of the engine bearings and pistons under all engine operating conditions, that is simple in construction and efficient in operation.

Other and further objects and advantages of the invention will appear from the following description, taken in connection with the accompanying drawing, in which:

Fig. 1 is a vertical section of an internal combustion engine of the multi-cylinder type showing the invention in position therein;

Fig. 2 is a similar view, but showing a modified form of lubricating system; and Fig. 3 is a view similar to Figs. 1 and 2, but showing a further modified form of lubricating system.

In lubricating systems for internal combustion engines, especially systems of the pressure type, considerable difficulty has been experienced in lubricating the bearings and cylinder walls when the engine is started in cold weather since under those conditions the oil is too thick and viscid to be properly conveyed through the passages.

When an engine is stopped after being run for some time, the cylinder walls are hot, and, consequently, most of the oil will drain therefrom, and unless these walls are lubricated immediately after starting the engine, great damage may result thereto.

The present invention seeks to remedy these difficulties by the provision of a new and improved means whereby under normal operating conditions oil will be supplied to the bearings and cylinder walls by what, for convenience of description, will be termed the primary or main system, and, under sub-normal conditions, as when first starting the engine when it is at low temperature, the parts will be properly lubricated automatically by what for convenience of description will be termed an auxiliary or secondary system. Both systems are enclosed within the crank case and, consequently, the systems are both not only protected against accidental breakage, distortion and the like during repair on the engine, the removal and replacement of rings, cleaning of carbon from the pistons, or the like, but are also in such position that the heat of the engine will be conserved in warming the oil whereby a minimum time is required for the oil (even in cold weather) to become sufficiently fluid to readily pass through the primary lubricating system.

In the form of construction shown in Fig. 1, a primary and secondary system of lubrication is shown, but the auxiliary or secondary system is in the form of a splash feed arrangement—that is, it is of the non-pressure type. As shown, the reference character 1 designates an internal combustion engine of the conventional multi-cylinder or any type having the crank case 2, the cylinder 3, pistons 4, crank shaft 5, and links 6. Since the specific features of the engine constitute no part of the present invention, it is not thought necessary to further illustrate or describe the same.

The crank case is provided with the conventional pump 8 which discharges into a passage 7 leading to a header 9 from whence the oil is forced through conduits as 10 to the crank shaft 11 and connecting rod bearings constituting the primary lubricating system, as is well-known in the art.

A by-pass 12, 13 closed by a pressure regulator valve 14 is in communication with the passage 7. The diameter of the passage 13 is small as compared with the diameter of the passage 7 whereby the flow therethrough of oil when cold is relatively materially retarded.

The auxiliary or secondary oiling system for oiling the pistons and cylinders when the oil is cold and viscid comprises the passage 15 in which is incorporated the pressure-actuated by-pass valve 18 adjacent the pump, and which leads from the pump discharge passage 7 to a header 16 having discharge orifices, as 17, above and in line with the connecting rod bearings 22. The valve 18 is held on its seat to close the passage 15 by a suitable spring 19 the tension of which may be regulated by the plug 21 tapped in the end of the valve chamber. The spring compression is so adjusted that the valve 18 will open responsive to the increased pressure within the passage 7, due to the greater viscosity of the oil when cold. From the header the oil will be forced through the apertures as 17 and falling by gravity upon the connecting rod bearings 22 and will be thrown by centrifugal action into the cylinders and upon pistons for oiling the same.

When the oil becomes heated, the pressure in the discharge passage 7 will diminish, the valve 18 will close, and the bearings will be oiled by the primary system in the usual manner, the pistons and cylinders being lubricated by the splash.

In Figs. 2 and 3, the two systems are also employed, but in both figures the principal system is what may be termed the open system because the oil therein may, when the pressure increases, discharge directly into the crankcase without the aid of relief or pressure valves of any form.

In both forms the discharge passage 23 from the pump 24 conducts the oil to a header 25 from which it passes by conduits as 26 to the crank case bearings as 27, the overflow passing down the overflow pipes or passages as 28 into the troughs as 29. The overflow pipes 28 extend slightly above the level of the lower portion of the conduits 26 in order to insure lubrication of the crank shaft bearings, the excess passing off through the pipes into the troughs 29. The connecting rod bearings 31 are provided with the usual fingers 32 and openings 33 for oiling the bearings 31 from the trough in the usual manner.

In Fig. 2 a passage 35 leads to a header 36 and conduits as 37 conduct the oil to the interior of the cylinders and to the pistons for lubricating the same. In the operation of the device shown in Fig. 2 the oil, when it is cold, is too viscid to all run down the conduits 26 which are of much less diameter than the passage 23 and consequently builds up a pressure in the passage 35, thus forcing oil onto the cylinders and also onto the bearings 27 and through the tubes 28 into the troughs 29 for oiling the bearings as 31. It will be seen that while the oil is being forced through the passage 37 to the interior of the cylinder, some of this oil will be free to flow into the cylinder while the piston is at the upper limit of its travel above said passage and will fall by gravity onto the crankcase for assisting in lubricating the bearings associated therewith. When the oil is hot a sufficient accumulation in the troughs 29 is assured to provide for the lubrication of the cylinders by the splash system.

The construction shown in Fig. 3 differs from that just described in that a passage 38 leading from the header 25 conducts oil to a header 39 located at a point above the header 25. The header 39 is provided with discharge openings 41 so arranged that oil discharged therefrom will fall in the path of the cranks on the crank shaft whereby oil will be splashed on the cylinder walls and pistons when it is discharged through said openings.

When the oil is cold, it will be too thick and viscid to pass readily through the restricted passages 26 and pipes 28, consequently it will pass up through the passage 38 into the header 39 and out through the apertures 41 onto the crank shaft and connecting rod bearings which throw the same onto the piston and cylinder walls for lubricating the same.

It will be noted that no valves are employed in either of the forms shown in Figs. 2 or 3. This is considered an important feature of this form of the construction.

In all forms of construction the lubrication is accomplished by a main or principal system during the normal operation of the engine, and certain indispensable portions, as the cylinders and pistons, are lubricated by an auxiliary system independently of the main system when said main system, due to the viscosity of the oil, does not properly function to lubricate all parts of the engine.

In all forms of construction, both systems are entirely enclosed within the crank case. This is considered an important feature of the invention. The conduits or passages and headers may all be integral with the crank case, or they may be separate, as desired. As shown, they are all integral with the crank case except the conduit 28.

This is a division of my application Serial No. 336,158, filed January 30, 1929, which matured into Patent 1,992,339, Feb. 26, 1935.

I claim as my invention:—

1. In an internal combustion engine having a crank case, an oil pump within said case, bearings within said case, a main lubrication system comprising a pump and conduits for conducting oil from said pump to said bearings, and means supplied with oil by said pump for supplying oil to said bearings by gravity when the pressure within said conduits rises above a predetermined minimum.

2. In a multi-cylinder internal combustion engine having a crank case, bearings within said case, a splash pan beneath said bearings, a pump within said case, a conduit within said case leading from said pump to a cylinder wall of said engine for lubricating said wall, only where the pressure of the oil in said conduit rises above a predetermined amount, a branch conduit within said case for lubricating said bearings, and an overflow conduit within said case for relieving pressure within said first-named conduit and for supplying oil to said splash pan for lubricating said bearings.

3. In an internal combustion engine having a crank case, a pump within said case, an oil header within said case, a conduit extending from said pump to said header for supplying oil thereto, an oil pan within said case, an overflow pipe for said header for supplying oil to said pan, means for discharging oil onto the cylinders and bearings when the pressure within said header rises above a predetermined minimum, and dip fingers for conducting oil from said pan into said bearings.

4. In a multi-cylinder internal combustion engine having a crank case, surfaces adapted to be lubricated within said case, a pump, upper and lower headers, a main passage for conducting oil to said headers from said pump, passages unobstructed between the ends thereof leading from said headers to said surfaces whereby said pump will normally deliver oil to said lower header to be supplied to certain of said bearings and when the pressure in the lower header rises above a predetermined amount, oil will be supplied to certain of said bearings from said upper header.

5. In an internal combustion engine having a crankcase, bearings for said engine, a lubricating system for said engine within the outer confines of said case, said system comprising a pump, an open passage from said pump to certain of said bearings, and means for conducting oil and freely discharging the same into space above said last-named bearings for lubricating the same by gravity only when the pressure within said first-named passage rises above a predetermined amount.

6. In a multi-cylinder internal combustion engine having a crankcase, bearings for said engine, a lubricating system for said bearings, comprising a pump within said casing, a passage extending upwardly above said bearings and having a branch conduit extending downwardly to said bearings for conducting oil thereto for lubricating the same, said first-named conduit extending above said branch conduit and terminating in a discharge outlet for discharging oil into space above said bearings for lubricating the same only when the pressure within said branch conduit rises above a predetermined amount.

CHARLES AMBROSE WINSLOW.